United States Patent
Tuschel et al.

(10) Patent No.: US 7,554,659 B2
(45) Date of Patent: Jun. 30, 2009

(54) HYPERSPECTRAL VISIBLE ABSORPTION IMAGING OF MOLECULAR PROBES AND DYES IN BIOMATERIALS

(75) Inventors: David Tuschel, Monroeville, PA (US); Arjun Bangalore, Monroeville, PA (US); Oksana Klueva, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 155 days.

(21) Appl. No.: 11/527,112

(22) Filed: Sep. 26, 2006

(65) Prior Publication Data

US 2007/0019198 A1 Jan. 25, 2007

Related U.S. Application Data

(63) Continuation-in-part of application No. 11/399,032, filed on Apr. 6, 2006, now Pat. No. 7,317,526, which is a continuation of application No. 10/882,082, filed on Jun. 30, 2004, now Pat. No. 7,046,359.

(60) Provisional application No. 60/778,794, filed on Mar. 3, 2006, provisional application No. 60/720,531, filed on Sep. 26, 2005.

(51) Int. Cl.
 *G01J 3/42* (2006.01)
 *G01J 3/28* (2006.01)
(52) U.S. Cl. ..................... 356/307; 356/326
(58) Field of Classification Search ............. 356/73, 356/301, 307, 326, 328
See application file for complete search history.

(56) References Cited

U.S. PATENT DOCUMENTS

| | | | | | |
|---|---|---|---|---|---|
| 4,948,974 | A | * | 8/1990 | Nelson et al. | 250/358.1 |
| 2006/0170907 | A1 | * | 8/2006 | Tuschel | 356/73 |

FOREIGN PATENT DOCUMENTS

WO PCT/US2006/037780 6/2008

* cited by examiner

*Primary Examiner*—F. L Evans
(74) *Attorney, Agent, or Firm*—Morgan Lewis & Bockius LLP (57) ABSTRACT

A system and method for obtaining hyperspectral visible absorption images. The system includes a light source which illuminates a sample containing light absorbing material, a platform, an optical lens, a detector. The platform has a section for placement of the sample and a section devoid of sample. The transmitted photons produced by the sample and collected by the optical lens are separated into a plurality of wavelength bands using a filter or a fiber array spectral translator coupled to a spectrometer. The system includes a programmable code for operating in a sample mode or background mode and calculating an absorption image. In the background mode, the platform motion is controlled so the optical lens collects transmitted photons from the, portion of the platform devoid of sample to generate a background transmission image. In the sample mode, the platform motion is controlled so the optical lens collects transmitted photons from the sample to generate a sample transmission image. The sample transmission image and the background transmission image are used to generate a photon absorption image of the sample.

11 Claims, 6 Drawing Sheets

HYPERSPECTRAL VISIBLE ABSORPTION IMAGING OF MOLECULAR PROBES AND DYES IN BIOMATERIALS

RELATED APPLICATIONS

This application claims the benefit of U.S. Provisional Application No. 60/720,531, filed Sep. 26, 2005, entitled "Hyperspectral Visible Absorption Imaging of Molecular Probes and Dyes in Biomaterials." This application also claims the benefit of U.S. Provisional Application No. 60/778,794, filed Mar. 3, 2006, entitled "FAST (Fiber Array Spectral Translator) Based System and Method of Polymorph Screening."

This application is a continuation-in-part of U.S. patent application Ser. No. 11/399,032, filed Apr. 6, 2006 now U.S. Pat. No. 7,317,526 which is a continuation of U.S. patent application Ser. No. 10/882,082, filed Jun. 30, 2004, now U.S. Pat. No. 7,046,359.

Each of the above referenced applications is incorporated herein by reference in its entirety. Each of the above referenced applications is assigned to the assignee of the present application.

FIELD OF DISCLOSURE

The present disclosure relates generally to a system to perform hyperspectral absorption imaging in the ultraviolet ("UV") or visible wavelength region.

BACKGROUND

Chemical imaging is known in the art. One example of an apparatus used for chemical imaging is taught in U.S. Pat. No. 6,002,476, entitled "Chemical Imaging System," to Treado et al. Another example of an apparatus used for chemical imaging is taught in U.S. Pat. No. 7,019,296, entitled "Near Infrared Chemical Imaging Microscope," to Treado et al.

In contrast to the prior art, the present disclosure describes a system and method for generating spatially accurate spectra and wavelength resolved absorption images at wavelengths ranging from 200 nm to 750 nm.

SUMMARY

The present disclosure provides for a system and method for obtaining hyperspectral visible absorption images. The system includes a light source which illuminates a sample containing light absorbing material, a platform, an optical lens, and a detector. The platform has a section for placement of the sample and a section which is devoid of sample. The transmitted photons produced by the sample and collected by the optical lens are separated into a plurality of wavelength bands. The collected photons have wavelengths ranging from 200 nm to 750 nm. The system includes a programmable code for operating in a sample mode or background mode and calculating an absorption image. In the background mode, the platform motion is controlled so the optical lens collects transmitted photons from the portion of the platform which is devoid of a sample to generate a background transmission image. In the sample mode, the platform motion is controlled so the optical lens collects transmitted photons from the sample to generate a sample transmission image. The sample transmission image and the background transmission image are used to generate a photon absorption image of the sample.

In one embodiment, the system includes a fiber array spectral translator device coupled to a spectrograph which disperses the collected photons into a plurality of spatially accurate spectra. In another embodiment, the system includes a filter coupled between the optical lens and the detector. The filter sequentially filters the collected photons in each of a plurality of predetermined wavelength bands and directs the filtered photons to the detector.

The present disclosure further provides for a storage medium containing a machine readable program code which causes a processor to perform a variety of functions. A light source is configured to illuminate a sample containing light absorbing material with a plurality of photons. An optical lens is configured to collect photons transmitted through said sample. A detector is configured to detect said collected photons so as to generate a first transmission image of said sample in a spatially accurate manner. The programmable code also causes the processor to control the motion of a platform holding a sample and repositioning of the platform. The code further causes the processor to generate a photon absorption image of the sample.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings.

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts.

The present disclosure provides a system and method for obtaining hyperspectral absorption images at wavelengths ranging from 200 nm to 750 nm. Absorption images are advantageous because the concentration of an absorbing material in the sample under analysis is quantitatively related to its absorption value. To obtain absorption images, it is necessary to collect both a background transmission image and a sample's transmission image as described below.

Figure 1:
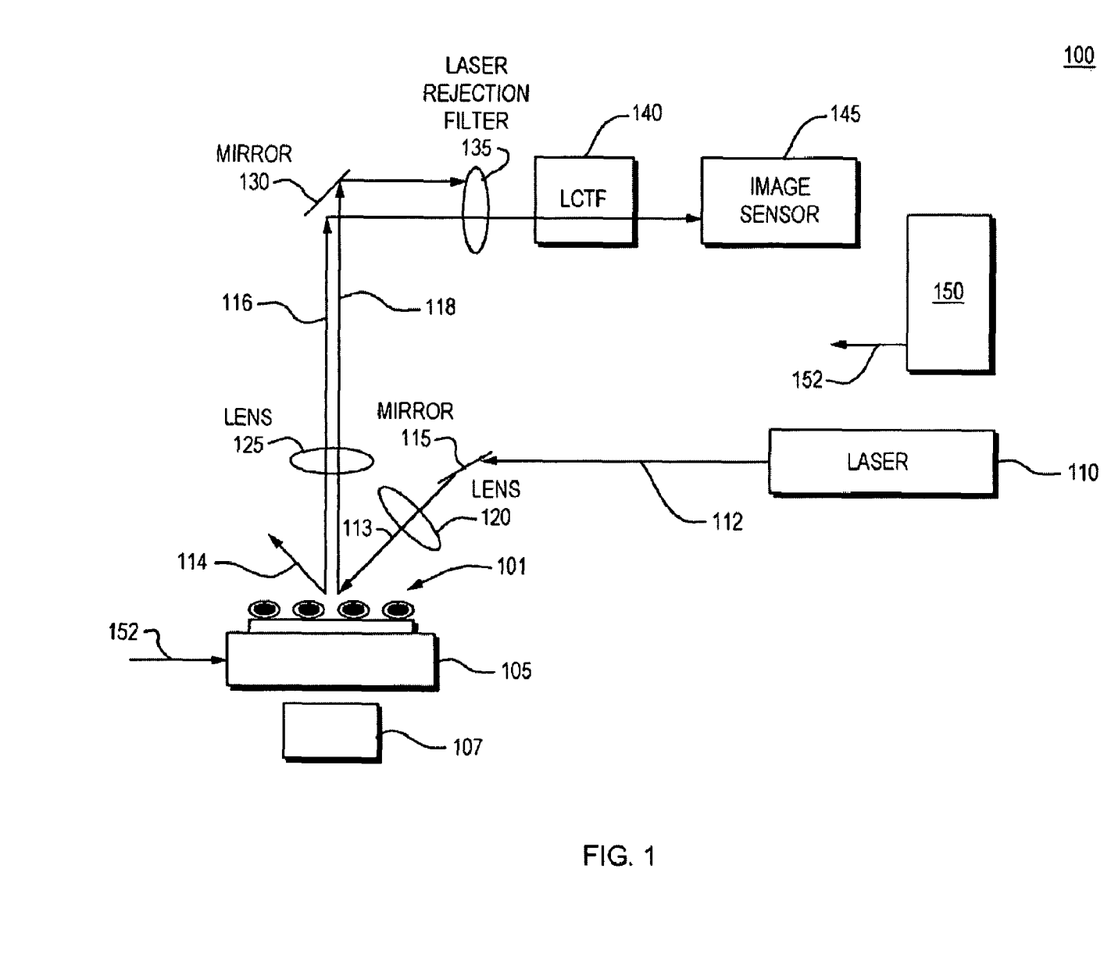
FIG. 1 schematically represents a system according to one embodiment of the disclosure.

FIG. 1 schematically illustrates an exemplary system 100 of the present disclosure. A sample 101 is positioned on platform 105. Sample 101 may be any sample containing light absorbing material. Platform 105 has a section for at least one sample and a section which is devoid of the sample. Platform 105 is responsive to programmable code 152 which controls the motion of the platform sections relative to optical lens 125. The programmable code 152 instructs the processor 150 to move the platform 105 in the x, y or z directions in such a manner to position the section of the platform 105 that contains a sample out of the field of view of optical lens 125.

The x, y or z directions are performed in the reverse direction to return the platform to the position where the sample 101 is in the field of view of optical lens 125.

System 100 of the present disclosure includes a white light source 107 located under the sample 101. White light source 107 may include any light source which produces broadband light. Light source 107 functions to illuminate sample 101 with a plurality of photons which are either absorbed by the sample or transmitted through the sample.

System 100 optionally includes a substantially monochromatic light source 110 which is positioned to provide incident light to sample 101. Light source 110 can include any conventional photon source, including laser, LED, and other IR or near IR devices. Light source 110 may also be selected to provide evanescence illumination of the sample. In one embodiment, the line width of the light source 110 is in the range of about 15-25 cm$^{-1}$.

Referring still to FIG. 1, it should be noted that the monochromatic light source 110 is positioned to provide incident light along a first optical path 113, which is at an angle to sample 101 as opposed to light shining orthogonal to sample 101. In other words, the radiation used to illuminate the sample need not pass through the optical train of a conventional microscope (or macroscope); rather, it can illuminate the sample at an oblique angle from above or below sample 101. Photon beam 112 is received and deflected by mirror 115 through lens 120. Lens 120 may optionally be used to focus the light on sample 101. Alternatively, the photon beam 112 may be directed towards the sample 101 without the need for the mirror 115.

The multitude of photons in beam 112 reaching sample 101 illuminate the sample 101 and are either scattered or emitted or absorbed from different locations on or within the sample, which can result in subsequent emission (luminescence) at different wavelengths. As known to those skilled in the art, the term "luminescence" includes a wide range of optical processes described using other names. These include: fluorescence, phosphorescence, photoluminescence, electroluminescence, chemiluminescence, sonoluminescence, thermoluminescence and even upconversion.

Optical lens 125 functions to collect photons transmitted photons represented by photon beam 116. Optical lens 125 may be used for collecting and focusing received photon beams. This includes gathering and focusing both polarized and the un-polarized photons. In general, the sample size determines the choice of light gathering optical lens 125. For example, a microscope lens may be employed for analysis of the sub-micron to micrometer specimens. For larger samples, macro lenses can be used. Optical lens 125 (as well as lens 120) may include a simple reduced resolution/aberration lens with a larger numerical aperture to thereby increase the system's optical throughput and efficiency. Mirror 130 is positioned to direct transmitted photon beam 116 to device 140. It should be noted that placement of mirror 130 is optional and may be unnecessary in configurations where device 140 is positioned above sample 101.

System 100 includes a device that separates the collected photons into a plurality of wavelengths. In one embodiment, system 100 includes a tunable filter 140, such as electro-optical tunable filters, liquid crystal tunable filter ("LCTF") or acousto-optical tunable filter ("AOTF"). Tunable filter 140 functions to sequentially pass, the transmitted photons, into a plurality of predetermined wavelength bands. The plurality of predetermined wavelength bands include specific wavelengths or ranges of wavelengths. In one embodiment, the predetermined wavelength bands include wavelengths characteristic of the sample undergoing analysis. The choice of tunable filter depends on the desired optical region and/or the nature of the sample being analyzed. The two-dimensional tunable filter includes a Fabry Perot angle tuned filter, an acousto-optic tunable filter, a liquid crystal tunable filter, a Lyot filter, an Evans split element liquid crystal tunable filter, a Solc liquid crystal tunable filter, a spectral diversity filter, a photonic crystal filter, a fixed wavelength Fabry Perot tunable filter, an air-tuned Fabry Perot tunable filter, a mechanically-tuned Fabry Perot tunable filter, and a liquid crystal Fabry Perot tunable filter. The tunable filer is selected to operate in one or more of the following spectral ranges: the ultraviolet (UV), visible, near infrared, and mid-infrared.

Figure 2:
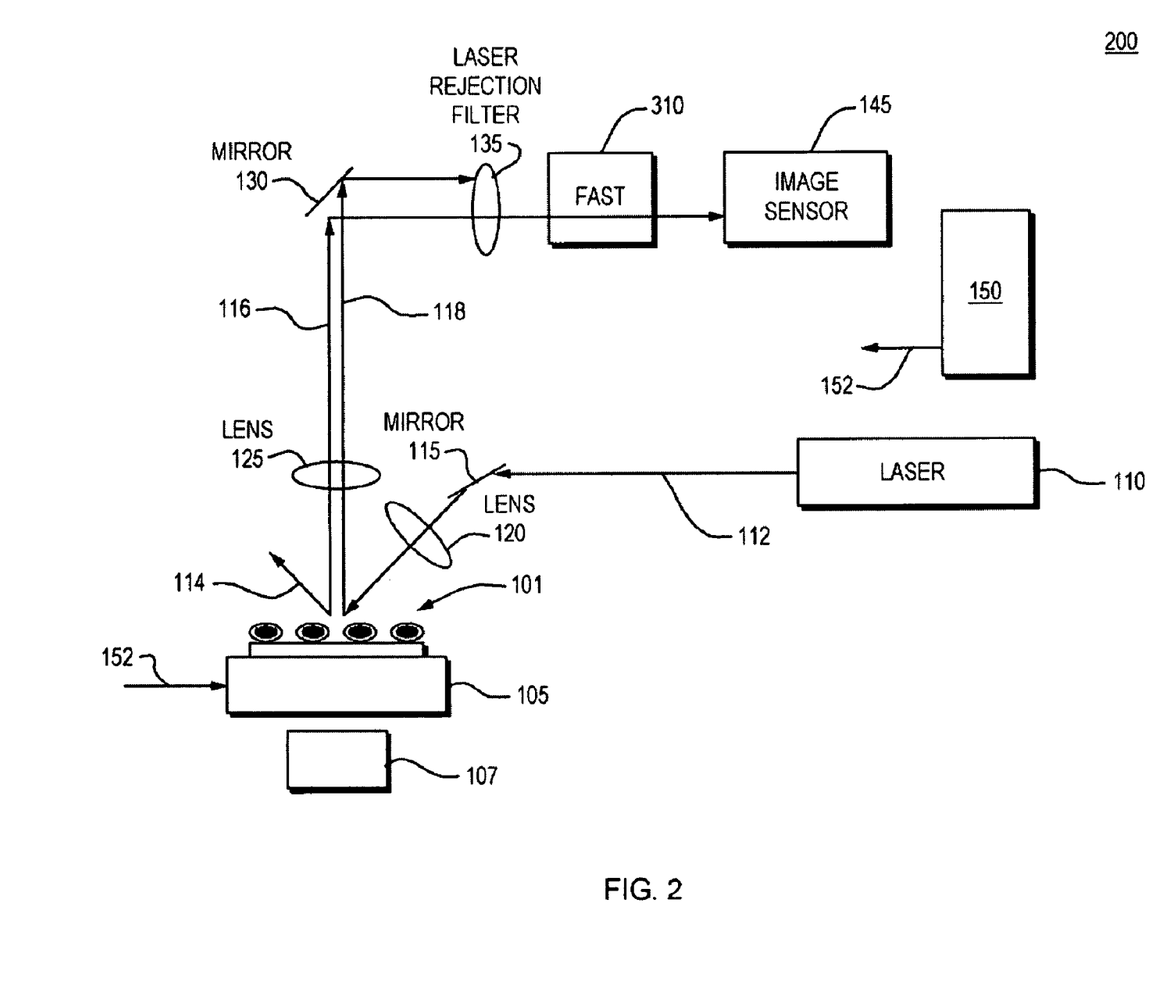
FIG. 2 schematically represents a system according to another embodiment of the disclosure.
Figures 3A, 3B:
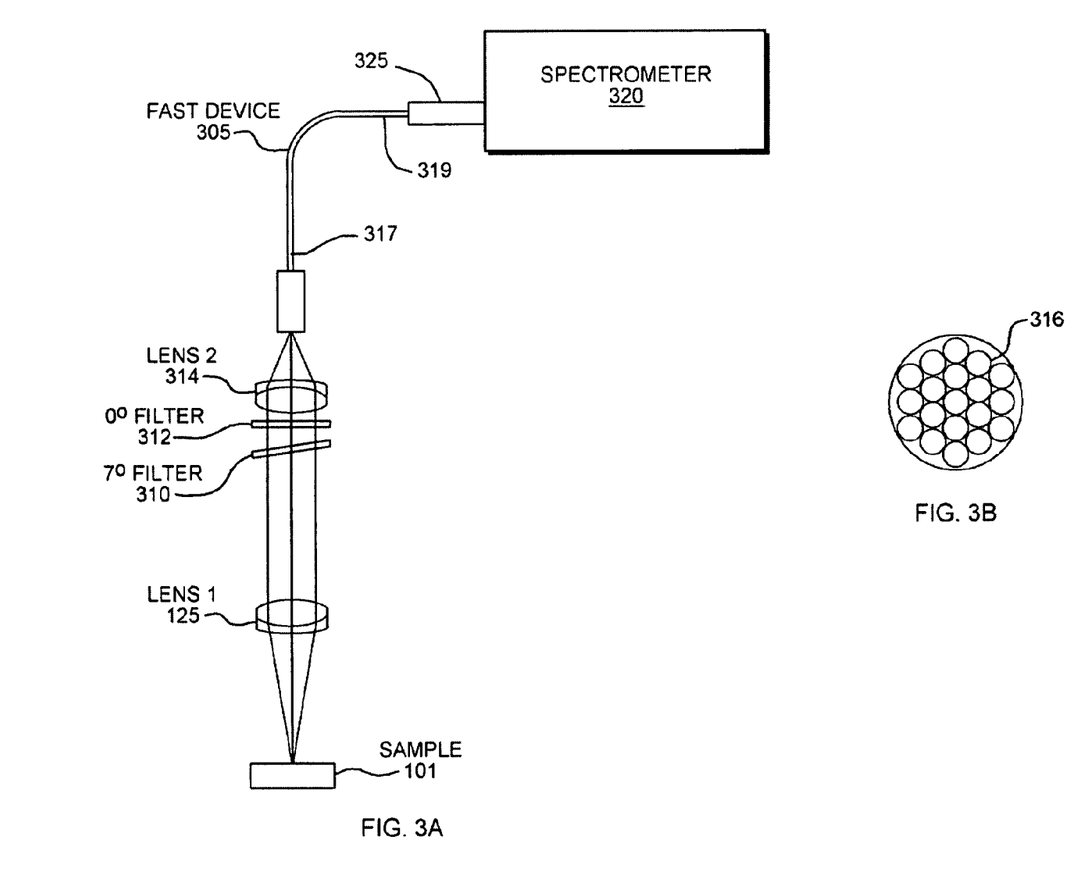
FIG. 3 schematically represents a device used in the system of this disclosure.

In another embodiment, the present disclosure provides for system 200 which includes a fiber array spectral translator ("FAST") as illustrated in FIG. 2. Using the fiber array spectral translator device 305 (FAST"), system 200 simultaneously acquires up to thousands of full spectral range, spatially resolved UV and or visible spectra. With reference to FIG. 3, the FAST device 305 is shown relative to objective lens 125. The FAST device 305 is optically coupled to a first filter 310, a second filter 312, a second lens 314, a first end of a fiber bundle 317 and a second end of the fiber bundle 319 which is connected to a spectrometer 340. The first lens 125 acts as a collecting lens to collect photons transmitted through sample 101. Lens 125 collimates the photons produced by the sample projecting the photons into infinity. The second lens 314 is used in combination with the first lens 125 to form images at the final focal plane of the second lens 314. The first end of the fiber bundle 317 is comprised of a two dimensional non-linear array of fiber bundles 316, FIG. 3B. The second end of the fiber bundle 319 is comprised of a curvilinear array of fiber bundles wherein curvilinear may include a straight line as well as a curved line configurations.

Referring to FIG. 3, the collected light is focused onto the first end of the fiber bundle. The one dimensional fiber array 305 is coupled to spectrometer 320 through fiber position device 325. In one embodiment, the spectrometer 320 includes a dispersive UV-Visible spectrometer. In another embodiment, the fiber array spectral translator 305 may have 19 collection fibers. The entrance slit of the spectrometer 320 is optically coupled to the FAST fiber 305 to disperse transmitted photons and generate a plurality of spatially accurate UV and or visible transmission spectra.

Referring to FIGS. 1 and 2, systems 100 and 200 also include a two-dimensional array of detection elements 145, such as for example an image focal plane array ("FPA") or CCD or CMOS sensor. Detector 145 functions to detect the separated photons and generate spatially accurate wavelength resolved transmission images or spatially resolved transmission spectra. The optical region employed to characterize the sample of interest governs the choice of two-dimensional array detector. In one embodiment, detector 145 detects a plurality of spatially resolved visible light transmission spectra. In another embodiment, detector 145 detects a plurality of spatially accurate wavelength resolved visible light transmission images. In yet another embodiment, detector 145 detects a plurality of spatially resolved ultraviolet light transmission spectra. In still another embodiment, detector 145 detects a plurality of spatially accurate wavelength resolved ultraviolet light transmission images.

Systems 100 and 200 further include programmable code 152, executable by processor 150, for alternatively configuring the system in a sample mode or a background mode. In the background mode, processor 150 executes the code to control the motion of platform 105 to enable optical lens 125 to collect photons from the section of platform 105 which is devoid of sample 101 during illumination of this section of the platform. Detector 145 then generates a background transmission image of a sample-less background as described above.

In the sample mode, processor 150 executes the code to control the motion of platform 105 to reposition the platform enable optical lens 125 to collect photons from the portion of platform 105 which contains sample 101. Detector 145 then generates a transmission image of the sample 101 as described above.

Systems 100 and 200 further yet include programmable code to configure processor 150 to generate a photon absorption image of sample 101 based on the background transmission image and the transmission image of sample 101. This conversion of the transmission image to an absorption image is based on the empirical relationship of the Beer-Lambert equation.

The hyperspectral imaging system disclosed in U.S. patent application Ser. No. 11/393,395, filed Mar. 30, 2006, may also be used to carry out the method of the present disclosure, and is incorporated by reference herein in its entirety.

Figure 4:
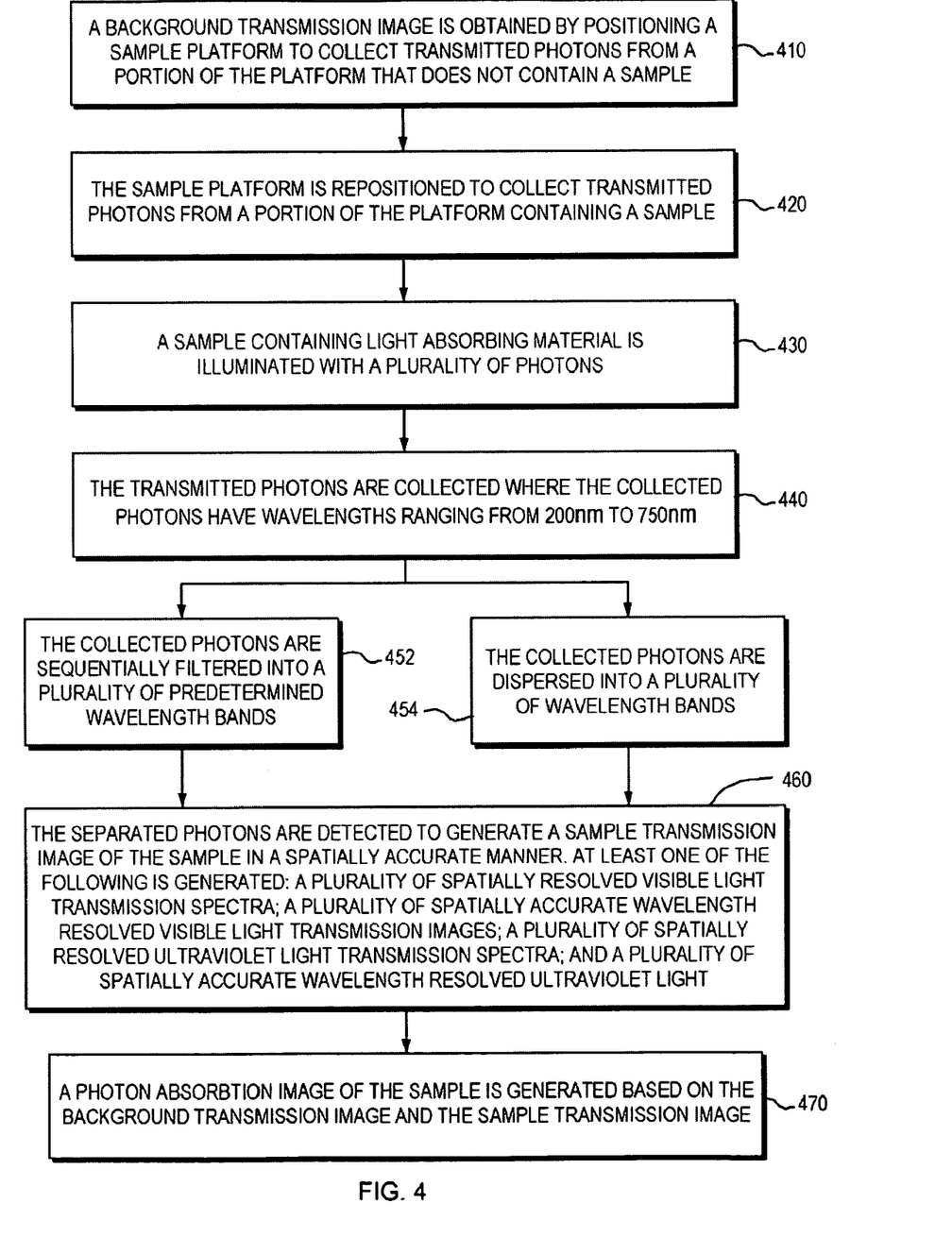
FIG. 4 is a flow chart illustrating a method of the present disclosure.

FIG. 4 is a flow chart illustrating a method of the present disclosure. In step 410, a background transmission image is obtained by positioning a sample platform to collect transmitted photons from a portion of the platform that does not contain a sample. In step 420, the sample platform is repositioned to collect transmitted photons from a portion of the platform containing a sample. In step 430, a sample containing light absorbing material is illuminated with a plurality of photons. In step 440, the photons transmitted through the sample are collected where the collected photons have wavelengths ranging from 200 nm to 750 nm. In one embodiment, the collected photons may be sequentially filtered into a plurality of predetermined wavelength bands, step 452. In another embodiment, the collected photons may be dispersed into a plurality of wavelength bands, step 454. In step 460, the dispersed or filtered photons are detected to generate a sample transmission image. At least one of the following is generated by the detector: a plurality of spatially resolved visible light transmission spectra; a plurality of spatially accurate wavelength resolved visible light transmission images; a plurality of spatially resolved ultraviolet light transmission spectra; and a plurality of spatially accurate wavelength resolved ultraviolet light transmission images. In step 470, a photon absorption image of the sample is generated based on the background transmission image and the sample transmission image.

Figure 5A:
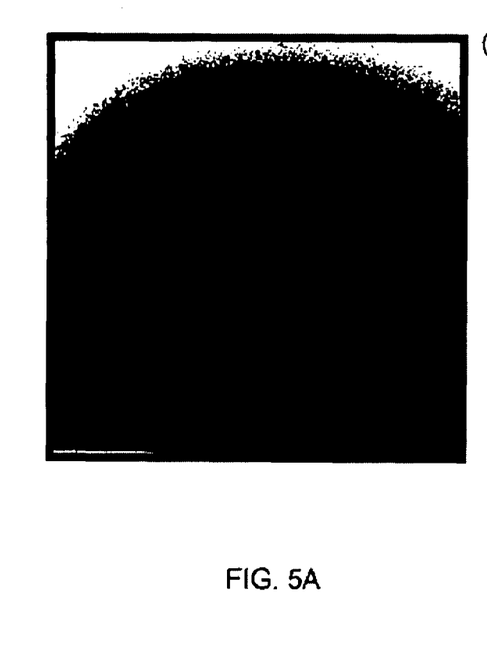
FIGS. 5A-5D illustrate the transmission and absorption images for Roscolux 4230-CalColor 30 Blue and the respective transmission and absorption visible spectra.
Figure 5B:
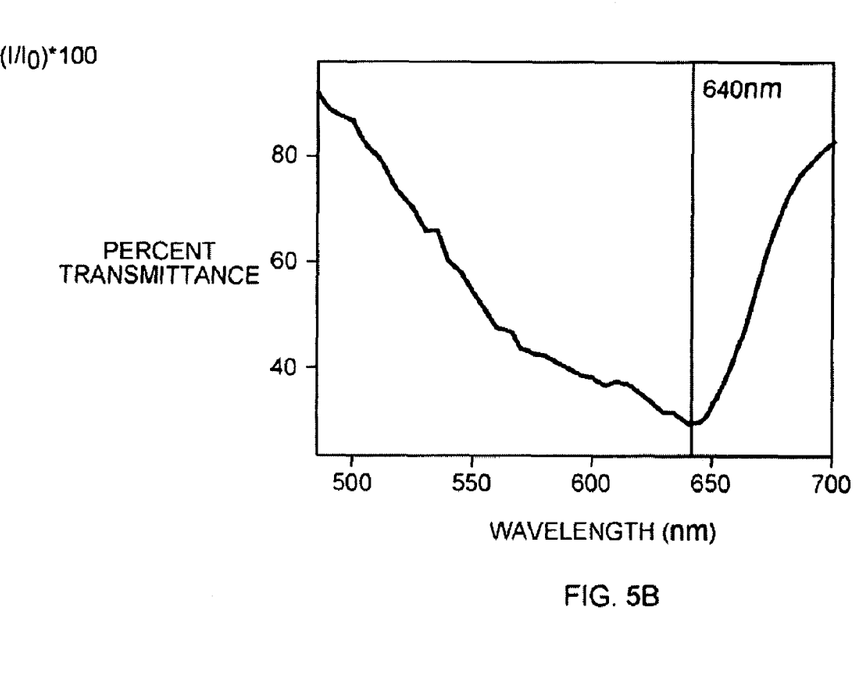
Figure 5C:
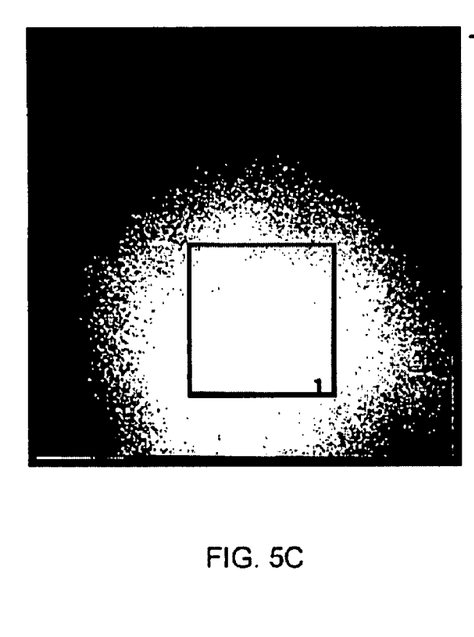
Figure 5D:
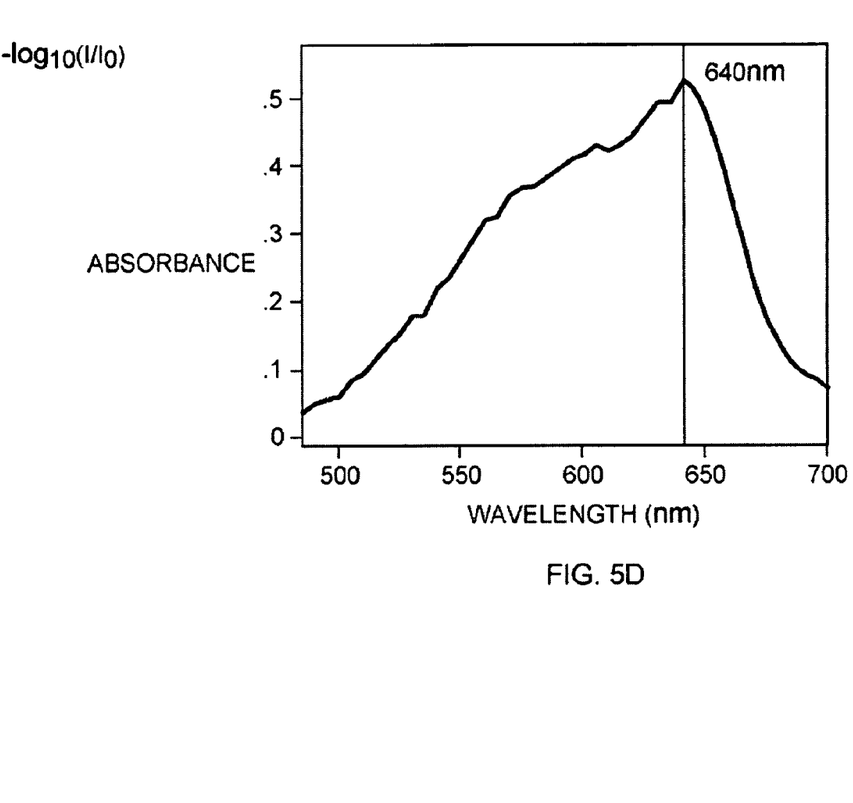

FIGS. 5A-5D illustrates images obtained by a system and method according to the present disclosure. The image in FIG. 5A is the transmission image of Roscolux 4230-CalColor 30 Blue which is a filter made from a sheet of plastic embedded with a light absorbing moiety. The transmission image of FIG. 5A was obtained at 640 nm. The associated visible transmission spectrum is shown in FIG. 5B where percent transmission is plotted versus wavelength. FIG. 5C illustrates the corresponding absorption image of Roscolux 4230-CalColor 30 Blue at 640 nm. The associated visible absorption spectrum is shown in FIG. 5B where absorbance is plotted versus wavelength and the absorbance equals $-\log[I/I_0]$. $I_0$ is the background transmittance value for the section of the platform without sample and I is the sample transmittance.

In one exemplary embodiment, the present disclosure uses a system such as that shown in FIG. 1 to detect dynamic changes that occur in sample 101 between a first time interval and a second subsequent time interval using a series of at least first and second sequential spatially accurate wavelength resolved images of sample 101. First a background transmission image is obtained by operating system 100 in the background mode. For subsequent sample transmission image collection, system 100 is operated in the sample mode. During the first time interval: (i) sample 101 is illuminated with photons from source 107 to produce photons transmitted through sample 101; (ii) a two-dimensional array of detection elements 145 is then used to simultaneously detect photons transmitted through the sample in a first predetermined wavelength band (selected by tunable filter 140) in the wavelength range of 200 nm to 750 nm; and (iii) for each of one or more further predetermined wavelength band(s) (each of which is sequentially selected using tunable filter 140). The two-dimensional array of detection elements 145 is thereafter used to simultaneously detect photons transmitted through the sample. The outputs of detector 145 (for each of the wavelengths or wavelength bands selected by tunable filter 140 during the first time interval) are processed and combined by processor 150 to generate a first photon absorption image of sample 101 based on the background transmission image and the transmission image of sample 101.

During the second subsequent time interval: (i) sample 101 is illuminated with photons from source 107 to produce photons transmitted through the sample 101; (ii) first two-dimensional array of detection elements 145 is then used to simultaneously photons transmitted through the sample, in a first predetermined wavelength band (selected by tunable filter 140) in the wavelength range of 200 nm to 750 nm; and, and (iii) for each of one or more further predetermined wavelength band(s) (each of which is sequentially selected using tunable filter 140). The two-dimensional array of detection elements 145 is thereafter used to simultaneously detect photons transmitted through the sample. The outputs of detector 145 (for each of the wavelengths or wavelength bands selected by tunable filter 140 during the first time interval) are then processed and combined by processor 150 to generate a second photon absorption image of sample 101 based on the background transmission image and the second transmission image of sample 101.

The system and method of the present disclosure may be used in a variety of applications including bio-imaging of cells and cellular constituents, drug degradation, analyte-cell interaction, or combinations of thereof provided the sample contains light absorbing material at wavelengths ranging from 200 nm to 750 nm. The light absorbing material may be inherent to the sample or the sample may be treated with a dye. In one embodiment, the dye includes a flourophor. Suitable flourophors include an immuno-fluorescent compound, a basophilic compound, an acidophilic compound, neutral stains and naturally occurring luminescent molecules.

The system and method of the present disclosure may be used to determine the chemical environment, such as pH or polarity, within a biomaterial. The chemical environment will be determined by changes in absorption band structure such as peak position, band width and relative intensities.

The system and method described herein may also be used to determine the location of UV and/or visible light absorbing molecular probes or dyes in biomaterials. The location of the UV and/or visible light absorbing molecular probes or dyes will be determined through absorption images and by changes in absorption band structure such as peak position, band width and relative intensities The system and method described herein are suitable for bio-imaging of cells of substantially any type, and constituents of a cell where the cell has been tagged with a stain or molecular probe. The cell includes one or more cells of any eukaryote or prokaryote or mixed samples of the two or more cell types. Exemplary cells include cells of humans, nonhuman animals, agriculturally significant plants (e.g., crop plants and weeds) or other plants, fungi, protists, eubacteria, archaebacteria, and mycoplasmas. Exemplary constituents of cells include a protein, an organelle, a protein complex, a compartment, and a membrane. Cells analyzed using these methods can be obtained from a sample and imaged at a remote location, optionally after maintaining the cells in culture, treating the cells with a fixative, treating the cells with a drug, freezing the cells, or some combination of these. Alternatively, when the location of the cells and the design of the equipment described herein are compatible, the cells can be imaged in situ, for example in a human tissue, on the surface of an object, or within a three-dimensional body that permits UV or visible spectral analysis of at least a part of its interior.

In yet another embodiment, the system and method of this disclosure may be used to analyze analyte-cell interactions. The analyte may include a drug, a molecule having a fluorophore, a metabolite of the drug or combinations thereof. For example, when an analyte such as a drug binds with a cell or a cellular component, some of the spectroscopic aspects which identify the drug compound will often shift reflecting the interactions and bonding of the drug within the cell. For analysis of an analyte within a cell, the system of FIGS. 1 and 2 include magnification optics that permits visualization of cells or sub-cellular structures. One of skill in the art will understand that the selection of magnification optics will depend on the degree of detail needed in the analysis, the size of the sample or the desired resolution of portions of the sample. To analyze the analyte-cell interaction, an image frame of spectroscopic data is obtained for a desired sample, such as a cell or a portion of a cell, at one or more spectroscopic aspects that identify the analyte. Changes in the spectroscopic aspect(s) are then monitored. Spectral effects that reveal chemical interactions are changes in band intensity, shifts in band position, and changes in band width or band shape or symmetry. These and other effects will be monitored.

In one embodiment, the analyte includes an UV or visible active drug molecule or an UV or visible-active molecule of cellular origin that is known or expected to be influenced by a drug molecule. Occurrence, approximate concentration or amount, and location of the UV or visible-active component can be assessed in the focal plane of the field of view. The UV or visible spectral data can be combined with (e.g., overlaid with) a frame of image data obtained by another analytical mode including bright field imaging.

In one embodiment, the analyte is a two component system wherein one component produces transmitted photons and the other component emits photons upon illumination. Using the system of FIG. 1 or 2, absorption images are obtained at wavelengths or frequencies that identify the component which produces transmitted photons. Luminescence images may also be obtained, at wavelengths or frequencies that identify the component which emitted photons. The absorption and luminescence images are then used to analyze the cell-analyte interaction. Spectral effects that reveal chemical interactions are changes in band intensity, shifts in band position, and changes in band width or band shape or symmetry. In one embodiment, these and other effects will be monitored in the absorption images. In another embodiment, these and other effects will be monitored in both the absorption and luminescence images.

The system and method of the present disclosure may be used for spectroscopy analysis of the volume of an individual cell or throughout a three-dimensional mass of cells. In one embodiment, the method further includes the step of generating instructions that control the focusing depth of a lens and repeatedly performing the steps of passing, detecting, analyzing at different focusing depths. The outputs, at the different focusing depths are then combined to produce a three-dimensional image of the cell volume or volume of the mass of cells. In one embodiment, the sample includes a single cell, which is analyzed by repeatedly using different focusing depths within the cell to provide planar sections of such projections of the transmission image throughout the volume of the cell. These sections show subtle variations which can be assembled and processed to obtain three dimensional images of the drugs in cells. Such volumetric imaging depends on accurately achieving clear and accurate absorption images of the drug for each 'chemical' section (i.e., each focal plane), which is essential for such full volumetric imaging. Thus obtaining accurate absorption images for a single layer, section or two-dimensional projection of the cell as it lies on a substrate is important for volumetric imaging.

The system of FIGS. 1 and 2, described herein, can collect spectroscopic and image data over an entire field of view very quickly, and can capture meaningful data for processes having a characteristic time on the order of milliseconds, tens of milliseconds, hundreds of milliseconds, or longer. Few drugs appear to exert their physiological effects on cells in time periods shorter than this. In one embodiment, the system and method of the present disclosure may collect and analyze information about the cellular and sub-cellular location of spectroscopic active components, such as drugs and their metabolites. In another embodiment, information can be collected rapidly in a succession of images and these images can be stored and replayed.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A system comprising:
a light source that illuminates a sample containing light absorbing material with a plurality of photons;
an optical lens that collects those photons transmitted through said sample without being absorbed thereby;
a device that separates said collected photons into a plurality of wavelengths;
a detector that detects said collected and separated photons so as to generate a first transmission image of said sample in a spatially accurate manner; and
a fiber array spectral translator device coupled between said optical lens and said detector, wherein said fiber array spectral translator device includes a two-dimensional array of optical fibers drawn into a one-dimensional fiber stack so as to effectively convert a two-dimensional field of view into a curvilinear field of view, and wherein said two-dimensional array of optical fibers is configured to receive said photons collected by said optical lens and transfer the received photons out of said fiber array spectral translator device and to said device through said one-dimensional fiber stack.

2. The system of claim 1, wherein said device comprises:
a spectrograph coupled to said one-dimensional fiber stack of said fiber array spectral translator device, wherein an entrance slit of the spectrograph is coupled to said one dimensional fiber stack to disperse said photons transferred out of said fiber array spectral translator device.

3. A system comprising:
a light source that illuminates a sample containing light absorbing material with a plurality of photons;
an optical lens that collects those photons transmitted through said sample without being absorbed thereby;
a device that separates said collection photons into a plurality of wavelengths;
a detector that detects said collected and separated photons so as to generate a first transmission image of said sample in a spatially accurate manner;
a platform to hold said sample;
a program code for configuring the system to operate in a sample mode or a background mode; and
a processor configured to execute said program code to perform the following:
in said background mode, control motion of said platform to enable said optical lens to collect photons from a portion of said platform devoid of said sample, thereby enabling said detector to generate a second transmission image of a sample-less background, and
in said sample mode, control motion of said platform to reposition said platform so as to enable said detector to generate said first transmission image of said sample.

4. The system of claim 3, wherein said processor, upon execution of said program code, is configured to generate a photon absorption image of said sample based on said first and said second transmission images.

5. A method comprising:
illuminating a sample containing light absorbing material with a plurality of photons;
collecting those photons transmitted through said sample without being absorbed thereby;
separating said collected photons into a plurality of wavelengths;
detecting said collected and separated photons so as to generate a first transmission image of said sample in a spatially accurate manner; and
configuring a fiber array spectral translator device to receive said collected photons at a two-dimensional end thereof and transfer said received photons for detection thereof through a one-dimensional end thereof as part of generation of said first transmission image.

6. The method of claim 5, wherein said separating step comprises: dispersing said photons transferred out of said one-dimensional end of said fiber array spectral translator device.

7. A method comprising:
illuminating a sample containing light absorbing material with a plurality of photons;
collecting those photons transmitted through said sample without being absorbed thereby;
separating said collected photons into a plurality of wavelengths;
detecting said collected and separated photons so as to generate a first transmission image of said sample in a spatially accurate manner;
executing a program code, for operating in a sample mode or a background mode;
wherein in said background mode, controlling motion of a platform configured to hold said sample to enable collection of photons from a portion of said platform devoid of said sample, thereby enabling generation of a second transmission image of a sample-less background; and
wherein, in said sample mode, controlling motion of said platform to reposition said platform so as to enable generation of said first transmission image of said sample.

8. The method of claim 7, further comprising;
upon execution of said program code, generating a photon absorption image of said sample based on said first and said second transmission images.

9. A system comprising:
means for illuminating a sample containing light absorbing material with a plurality of photons;
means for collecting those photons transmitted through said sample without being absorbed thereby;
means for separating said collected photons into a plurality of wavelengths;
means for detecting said collected and separated photons so as to generate a first transmission image of said sample in a spatially accurate manner; and
means for generating a second transmission image of a sample-less background; and means for generating a photon absorption image of said sample based on said first and said second transmission images.

10. A storage medium, containing machine readable code which, when executed by a processor, causes said processor to further perform the following:
configure a light source to illuminate a sample containing light absorbing material with a plurality of photons;
configure an optical lens to collect photons transmitted through said sample;
configure a device to separate said collected photons into a plurality of wavelengths;
configure a detector to detect said collected and separated photons so as to generate a first transmission image of said sample in a spatially accurate manner;
control motion of a platform holding said sample to enable said optical lens to collect photons from a portion of said platform devoid of said sample, thereby enabling said detector to generate a second transmission image of a sample-less background, and
control motion of said platform to reposition said platform so as to enable said detector to generate said first transmission image of said sample.

11. The storage medium of claim 10, wherein said machine readable program code, when executed by said processor, causes said processor to generate a photon absorption image of said sample based on said first and said second transmission images.

* * * * *